March 31, 1964     T. Z. GOLDMAN     3,127,191

PERISCOPIC REAR VIEW APPARATUS FOR VEHICLES

Filed Nov. 2, 1962

*INVENTOR:*
TIBOR Z. GOLDMAN

BY *Peter S. Tailer*

ATTORNEY 3,127,191
PERISCOPIC REAR VIEW APPARATUS
FOR VEHICLES
Tibor Z. Goldman, Casimiro Ulloa 242,
San Antonio, Lima, Peru
Filed Nov. 2, 1962, Ser. No. 235,036
1 Claim. (Cl. 280—87)

This invention relates to motor vehicles and, more particularly to rear view devices for automobiles, trucks, buses and the like, the devices providing the driver or operator with a view of the area to the rear of the vehicle without requiring the driver or operator to change from the position normally occupied while driving the vehicle.

Conventional rear view mirrors have several attendant disadvantages. If a rear view mirror is mounted within an automobile, it may be obstructed by passengers or objects within the vehicle. Whether located within or without the vehicle, a conventional rear view mirror presents an obstruction to the vision of the driver as it partially blocks his view and creates a blind spot. Further, the driver must be momentarily distracted while he remembers the one of many possible locations for his conventional rear view mirror. The best location for a rear view device is directly in front of the driver. A conventional rear view mirror cannot be so located as the driver would block his own rear view.

It is, therefore, an object of this invention to provide a rear view device for automobiles which presents no obstruction to the vision of the driver.

Another object of this invention is to locate a rear view device for vehicles in the most natural, desirable and useable location directly before the driver.

A further object of this invention is to provide a more conveniently located and thus a more efficient and safer rear view device for the driver of an automobile.

Many other objects, advantages and features of invention reside in the construction, combination and arrangement of parts involved in the embodiment of my invention and its practice as will be understood from the following description and accompanying drawing wherein.

Figure 1:
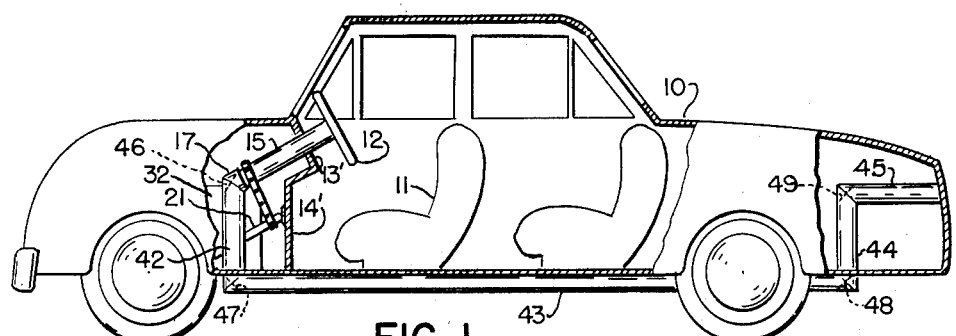
FIGURE 1 is a side view of an automobile with portions broken away in section showing my invention.

Referring to the drawing in detail, FIGURE 1 shows a conventional automobile 10 having a driver's seat 11 and a steering wheel 12. The steering wheel 12 is supported above a dash board panel 13' and the fire wall 14'.

Figure 2:
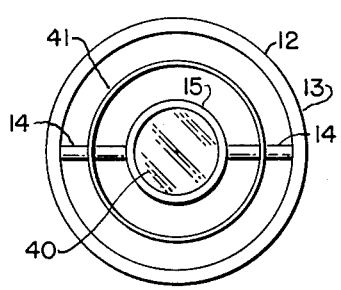
FIGURE 2 is a plan view of an automobile steering wheel according to my invention.
Figure 3:
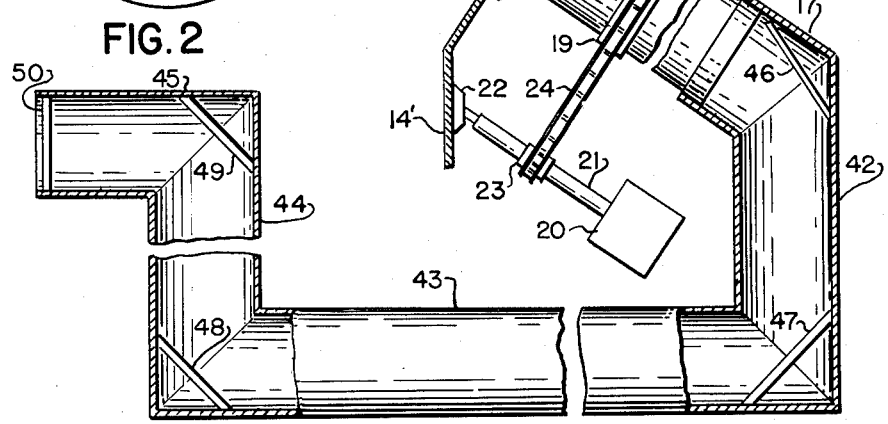
FIGURE 3 is a side view of the steering mechanism and the rear view device of my invention with portions broken away and with additional portions further broken away in section.

Referring now to FIGURES 2 and 3, the steering wheel 12 has its rim 13 supported by the two radial arms 14 which are fixed to the outside of the hollow steering column 15. The large diameter hollow steering column 15 projects through the dash panel 13' and is rotatably supported therein by means of a ball bearing 16 or any other suitable bearing means.

The lower end of the hollow tubular steering column 15 extends into the tube 17. A strip of nylon bearing material 18 enables the steering column 15 to turn easily within tube 17.

Figure 4:
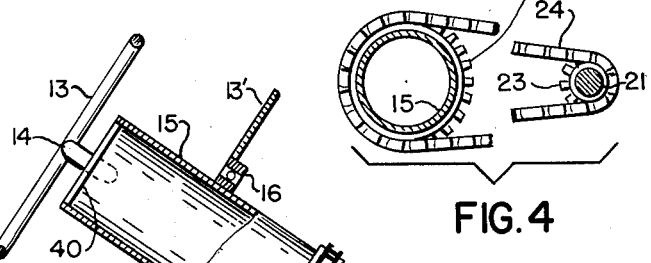
FIGURE 4 is a cross section through a steering wheel shaft and periscope section linked to a steering rod according to my invention.
Figure 5:
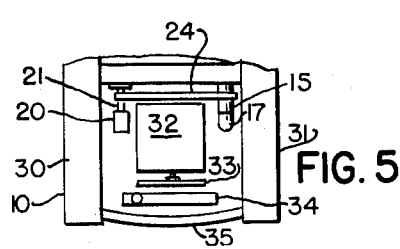
FIGURE 5 is a top view of a fragment of the front of an automobile with the hood removed.

As shown in FIGURES 3-5, a sprocket 19 is mounted on the steering column 15. A conventional steering gear box 20 has a steering shaft 21 project from it. The upper end of the steering rod 21 may be journaled in a suitable bearing block 22 which is fastened to the fire wall 14'. Another sprocket 23 is fixed to the steering shaft 21 so that sprocket 19 may drive sprocket 23 by means of a drive chain 24. If it is desired, any suitable positive drive means, such as link belting, may be substituted for the chain 24. Thus it may be seen that rotation of steering wheel 12 turns the steering column 15 to turn steering shaft 21 by means of the chain drive 24. The steering gear box 20 turns the front wheels of the automobile 10 in a conventional manner.

As shown in FIGURE 5, the front portion of car 10 has two fenders 30 and 31 between which there is disposed the engine 32, the cooling fan 33 and the radiator 34 behind a grill 35. Thus it may be seen that an automobile 10 may be manufactured, as is a conventional right hand drive automobile, with a steering gear box 20 disposed on its right hand side. A steering column 15 is turned by a steering wheel 12 located on the left hand side of the automobile. The steering column 15 drives shaft 21 by means of chain 24 to steer the vehicle in the manner which has been described.

As shown in FIGURE 1, the steering shaft 21 may be located on the left side of automobile 10 and be driven by a steering column 15 also located on the left side of the automobile 10. By the selection of sprockets 19 and 23 of desired and suitable pitch diameters to work with a given conventional steering gear box 20, a mechanical ratio may be obtained which simulates a powered steering control system.

Referring now to FIGURES 1, 2 and 3, a viewing lens 40 is disposed within the center of the steering column 15 in the center of steering wheel 12. A conventional horn ring 41 may also be mounted within rim 13 and connected with suitable means (not shown) to an automobile horn. Such suitable electrical means to connect a circuit made by horn ring 41 could be carbon brushes riding upon conducting slip rings mounted on steering column 15. The shift lever or automatic transmission selector (not shown) are best located on the dash panel 13' as the steering column 15 must remain hollow and unobstructed.

Tube 17 is fixed to a vertical tube portion 42 which may be welded or otherwise secured to the frame of automobile 10. Extending rearwardly from the bottom of portion 42 is a horizontal run of tubing 43. Tubing 43 extends rearwardly to terminate in the vertical portion 44. The upper end of portion 44 has the tubular end piece 45 attached to it. Within tube 17 and the portions joined to it there are disposed the mirrors 46, 47, 48 and 49. A glass or a suitable lens 50 covers the rear end of the end piece 45. Thus it may be seen that the hollow steering column 15 and the hollow tubes 17, 42, 43, 44 and 45 with the mirrors 46, 47, 48 and 49 form a periscope. By means of this periscope the driver of automobile 10 need only glance into the center of steering wheel 12 disposed directly in front of him to obtain a view in lens 40 from the rear of his vehicle. Naturally, suitable lenses and other well known optical devices may be added to my rear view periscope to render it more efficient.

While I have disclosed my invention in the best form known to me, it will nevertheless be understood that this is purely exemplary and that modifications in the construction, combination and arrangement of parts may be made without departing from the spirit of my invention except as it may be more limited in the appended claim wherein I claim:

In a vehicle, a periscopic rear view device for the driver of the vehicle comprising, in combination,
 (a) a steering wheel of the vehicle,
 (b) a dash panel of the vehicle,
 (c) bearing means in the dash panel of the vehicle, (d) a hollow steering column rotatably mounted in said bearing means and having a lower end and an upper end to which said steering wheel is fixed,
(e) tubular members joined at their ends fixed to the vehicle, said tubular members extending about the lower end of said steering column and extending to the rear of said vehicle,
(f) optical means within said steering column and said tubular members enabling the driver of the vehicle to look into the upper end of said steering column through said steering column and said tubular members, said optical means comprising at least mirrors,
(g) a steering gear box of said vehicle having a steering rod projecting from it,
(h) sprockets mounted on said steering column and said steering rod, and
(i) a chain connecting said sprockets.

References Cited in the file of this patent

UNITED STATES PATENTS

| | | |
|---|---|---|
| 1,478,650 | Hallengren | Dec. 25, 1923 |
| 2,375,887 | Barden | May 15, 1945 |
| 2,963,919 | Larsen | Dec. 13, 1960 |

FOREIGN PATENTS

| | | |
|---|---|---|
| 740,894 | France | Nov. 22, 1932 |